(12) United States Patent
Ji et al.

(10) Patent No.: US 9,456,200 B2
(45) Date of Patent: Sep. 27, 2016

(54) METHOD AND APPARATUS FOR CALIBRATION OF STEREO-OPTICAL THREE-DIMENSIONAL SURFACE-MAPPING SYSTEM

(71) Applicant: THE TRUSTEES OF DARTMOUTH COLLEGE, Hanover, NH (US)

(72) Inventors: Songbai Ji, Hanover, NH (US);
Xiaoyao Fan, Hanover, NH (US);
Keith D. Paulsen, Hanover, NH (US);
David W. Roberts, Lyme, NH (US);
Alex Hartov, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 148 days.

(21) Appl. No.: 14/370,713

(22) PCT Filed: Jan. 4, 2013

(86) PCT No.: PCT/US2013/020352
§ 371 (c)(1),
(2) Date: Jul. 3, 2014

(87) PCT Pub. No.: WO2013/103870
PCT Pub. Date: Jul. 11, 2013

(65) Prior Publication Data
US 2014/0362186 A1 Dec. 11, 2014

Related U.S. Application Data

(60) Provisional application No. 61/583,092, filed on Jan. 4, 2012.

(51) Int. Cl.
*G06K 9/00* (2006.01)
*H04N 13/02* (2006.01)
(Continued)

(52) U.S. Cl.
CPC .......... *H04N 13/0246* (2013.01); *G01C 11/02* (2013.01); *G01C 25/00* (2013.01); *G06T 3/0093* (2013.01); *G06T 2200/04* (2013.01); *H04N 2013/0074* (2013.01)

(58) Field of Classification Search
None
See application file for complete search history.

(56) References Cited

U.S. PATENT DOCUMENTS 6,793,350 B1 9/2004 Raskar et al.
8,406,859 B2 3/2013 Zuzak et al.
(Continued)

FOREIGN PATENT DOCUMENTS

KR 1020110097030 8/2011
WO 2013109966 A1 7/2013

OTHER PUBLICATIONS

Joshi. "DigiWarp: a method for deformable mouse atlas warping to surface topographic data" NIH Public Area, 2010.*
(Continued)

*Primary Examiner* — Bhavesh Mehta
*Assistant Examiner* — Oneal R Mistry
(74) *Attorney, Agent, or Firm* — Lathrop & Gage LLP (57) ABSTRACT

A system for, and method of, extracting a surface profile from a stereo pair of images obtained at an arbitrary setting S of an optical system, includes determining surface profile reconstruction parameters for images obtained with the optical system at a reference setting So of the optical system; determining warping parameters for a digital image processor for warping images obtained with the optical system at the arbitrary setting S into images corresponding to the reference setting So; obtaining the stereo pair of images from at least one camera of the optical system; warping the stereo pair of images into images corresponding to the reference setting So, and using the surface profile reconstruction parameters to determine the surface profile. In a particular embodiment, the surface profile is passed to a computer model of tissue deformation and used to determine an intra-surgery location of a tumor or other anatomic feature of tissue.

14 Claims, 3 Drawing Sheets

(51) Int. Cl.
*G01C 11/02* (2006.01)
*G01C 25/00* (2006.01)
*G06T 3/00* (2006.01)
*H04N 13/00* (2006.01)

(56) References Cited

U.S. PATENT DOCUMENTS

| | | |
|---|---|---|
| 2007/0236514 A1 | 10/2007 | Agusanto et al. |
| 2009/0036902 A1 | 2/2009 | DiMaio et al. |
| 2010/0085423 A1 | 4/2010 | Lange |
| 2010/0201789 A1 | 8/2010 | Yahagi |
| 2011/0102549 A1 | 5/2011 | Takahashi |
| 2011/0175910 A1 | 7/2011 | Yahagi |
| 2011/0222757 A1* | 9/2011 | Yeatman, Jr. ......... G06T 7/0075 382/154 |
| 2011/0293142 A1* | 12/2011 | van der Mark ....... G06T 7/0028 382/103 |
| 2013/0076863 A1* | 3/2013 | Rappel ................. H04N 13/004 348/46 |
| 2014/0063241 A1* | 3/2014 | Li ......................... G06T 7/0008 348/143 |
| 2015/0264340 A1 | 9/2015 | Seidl et al. |

OTHER PUBLICATIONS

PCT/US2013/020352 International Search Report & Written Opinion mailed Apr. 26, 2013, 9 pages.
PCT Application No. PCT/US14/51358 International Search Report and Written Opinion dated Dec. 9, 2014, 9 pages.
U.S. Appl. No. 14/375,311 Notice of Allowance dated Jan. 20, 2016, 28 pages.

* cited by examiner

METHOD AND APPARATUS FOR CALIBRATION OF STEREO-OPTICAL THREE-DIMENSIONAL SURFACE-MAPPING SYSTEM

RELATED APPLICATIONS

This application is a 35 U.S.C. §371 filing of International Application No. PCT/US2013/020352, filed Jan. 4, 2013, which claims priority to U.S. Patent Application Ser. No. 61/583,092, filed Jan. 4, 2012, the disclosure of which is incorporated herein by reference.

GOVERNMENT RIGHTS

The work herein described was performed with sponsorship from the National Institutes of Health grant number ROI CA159324-01. The United States Government has certain rights in the invention.

FIELD

The present document pertains to the field of electronic stereo-optical three-dimensional surface mapping. In a particular embodiment, the mapping of a biological tissue surface is achieved through variable-magnification zoom lenses during surgery.

BACKGROUND

Electronic stereo vision is frequently used for mapping three-dimensional surface structures in a variety of applications. These applications range from mapping of biological tissue surfaces during surgery to mapping of objects and terrain seen in aerial reconnaissance photographs.

Current systems for stereo-optical surface-mapping generally require a calibration phase be performed prior to surface-mapping, where the calibration phase uses the same lens configuration, including the same optical magnification and focal length, as used during the surface-mapping. Some stereo-optical surface-mapping is done with optical systems having fixed-magnification lens systems, including robotic systems for maneuver, parts placement, and inspection, and for aerial reconnaissance. Other optical systems, including some microscopes, may have rotary turrets where the lens system has a finite number of predetermined magnification levels and focal lengths, each of which can be calibrated separately. Typically, calibration entails calibrating the intrinsic and extrinsic parameters of the stereovision system by taking a stereo image pair, and matching a set of points with known 3D coordinates with their counterparts found in the two stereo images. A perspective projection matrix can then be established to reconstruct the 3D target surface following image rectification and triangulation of correspondence points. These techniques work best with constant, known, image magnification and focal length. Where optical zoom lenses are involved, prior systems have often been limited to a small subset of possible image acquisition settings where previous calibration has been performed.

One application where stereo-optical surface-mapping has been used to map surface features of biological tissues is brain surgery. When the skull is opened, the very soft brain tends to deform. The deformation may cause an apparent shift in location of structures that may have been mapped during preoperative imaging such as may have been performed with magnetic resonance imaging (MRI) and/or computed tomography (CT) scans. While these structures may be located with intraoperative MRI or CT scans, such scans are cumbersome to perform and repeated scans may be required as tissue shifts with repositioning of retractors.

Non-contact, stereo-optical surface mapping of the exposed brain has been performed to create an intraoperative surface map, such as a post-skull-opening surface map of brain tissue. This surface map has been used with a brain deformation model to determine post-opening, and post-tissue-retraction, locations of structures, including tumors, that were identified and mapped during preoperative imaging but shift in position as the brain deforms during surgery. A PHD thesis describing how a surface map is used with a brain deformation model may be found as Hai Sun, Stereopsis-Guided Brain Shift Compensation, A Thesis, Thayer School of Engineering, Dartmouth College, Hanover, N.H., May 2004, (Hai Sun) the contents of which are incorporated herein by reference.

Many existing surgical microscopes have optical zoom lenses instead of rotary turrets, these microscopes offer a continuously-variable range of magnification and focal length instead of a finite number of predetermined levels, and a surgeon may wish to change magnification and focus during surgery. It is desirable to adapt a surface-mapping system to mount to existing optical ports of such a microscope, and to ease acceptance of such a system by permitting the surgeon to change magnification, focus, and optical axis of the microscope while providing adequate surface mapping.

SUMMARY

A method of extracting a surface profile from a stereo pair of images obtained at an arbitrary setting S of an optical system, includes determining surface profile reconstruction parameters for images obtained with the optical system at a reference setting S0 of the optical system; determining warping parameters for a digital image processor for warping images obtained with the optical system at the arbitrary setting S into images corresponding to the reference setting S0; obtaining the stereo pair of images from at least one camera of the optical system; warping the stereo pair of images into images corresponding to the reference setting S0, and using the surface profile reconstruction parameters to determine the surface profile.

A system for extracting a surface profile has an adjustable optical system having a reference setting $S_0$ and at least one arbitrary setting S differing from reference setting S0, the optical system having at least one camera for obtaining stereo image pairs, and wherein settings S and S0 include at least a magnification of the adjustable optical system; an image processor coupled to receive stereo image pairs from the at least one camera of the optical system, further comprising a processor and a memory having recorded therein reconstruction parameters for determining a surface profile from images obtained with the optical system at the reference setting $S_0$, machine readable instructions for using warping parameters to warp images obtained with the optical system at the arbitrary setting S into images corresponding to the reference setting $S_0$; and machine readable instructions for using the reconstruction parameters to determine the surface profile.

DETAILED DESCRIPTION OF THE EMBODIMENTS

Figure 1:
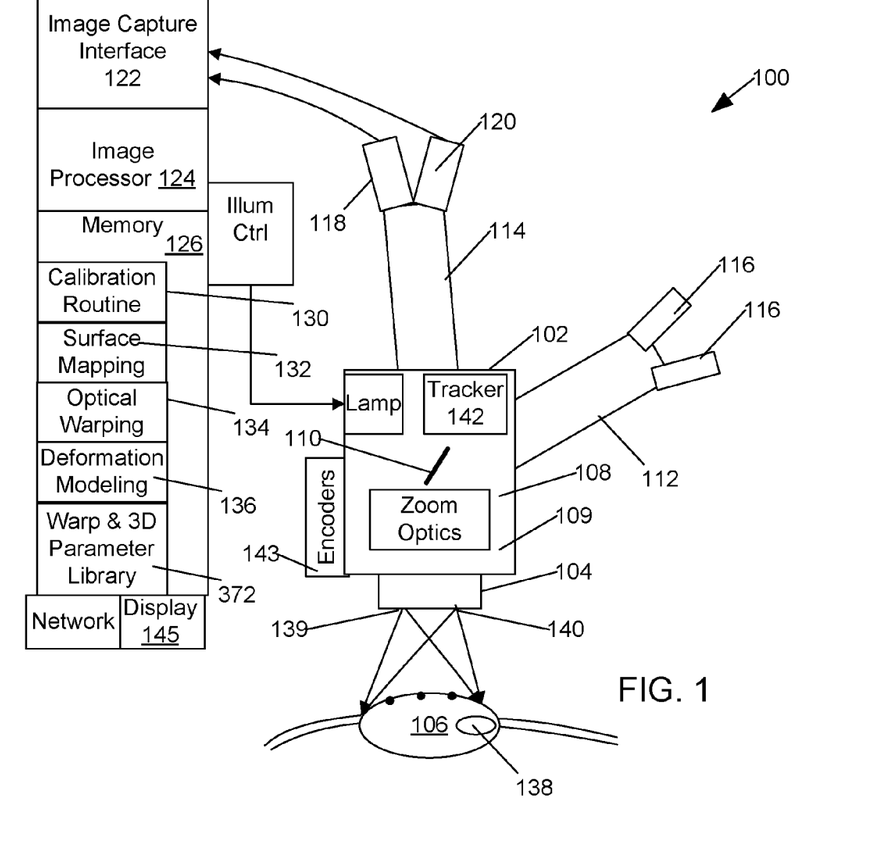
FIG. 1 is a block diagram illustrating a stereo surface-mapping system for use in surgery.

A surface-mapping system 100 for use during surgical procedures is based upon a stereo microscope 102. Microscope 102 has at least one objective 104; objective 104 is either a single objective wide enough to offer views of tissue 106 from two angles, or has two lenses, each positioned to view the tissue from a different angle. Light from each of two viewing angles enters the microscope 102 through objective 104 and through zoom optics 108 in microscope body 109, reaching a beam-splitting device 110. Typically, beam-splitting device 110 has a first mode where light passes into a surgeon's tube 112, a second mode where light passes into an auxiliary tube 114, and a third mode where light passes into both tubes 112, 114. After passing through objective 104, zoom optics 108, beam-splitting device 110, and surgeon's tube 112, light from each viewing angle of tissue 106 is presented to a separate eyepiece of surgeon's eyepieces 116, allowing the surgeon a view of tissue 106.

After passing through objective 104, zoom optics 108, beam-splitting device 110, and auxiliary tube 114, light from each viewing angle of tissue 106 is presented to a separate camera of stereo cameras 118, 120 where camera 118 is a left camera and camera 120 is a right camera. In an embodiment cameras 118, 120 are video cameras, and in an alternative embodiment, cameras 118, 120, are digital still cameras. Cameras 118, 120 are coupled to an image capture interface 122, and image capture interface 122 is configured to capture simultaneously an image from each camera 118, 120 as a stereo pair of images. Image capture interface 122, which in an embodiment where cameras 118, 120 are video cameras is a still-image capture circuit, and in an alternative embodiment is a dual-channel USB interface for digital still cameras, is configured to provide the stereo pair of images to image processor 124, which stores each captured stereo image pair in memory 126.

In a particular embodiment, used at Dartmouth, cameras 118, 120 are Flea2 model FL2G-50S5C-C C-mount cameras from Point Grey Research Inc.; Richmond, BC, Canada, these cameras are rigidly mounted through a binocular auxiliary port 114 on a Zeiss® OPMI® Pentero™ surgical microscope 102 (trademarks of Carl Zeiss, Inc., Oberkochen, Germany) such that one camera is coupled to receive images through each of the left and right optical paths of the port. An infrared-light-emitting tracker 142 is rigidly attached to the microscope, allowing its position and orientation to be determined with respect to a reference frame (i.e., "patient tracker") during image acquisition using a commercial tracking system, StealthStation® from Medtronics. The microscope has a zoom lens, permitting image magnification and focal length to be adjusted separately.

In addition to working memory for storing stereo pairs of images, derived surface maps, and intermediate manipulated images, memory 126 has a calibration routine 130, a surface mapping routine 132, an optical warping routine 134, and a routine for modeling elastic deformation of tissue 136. The calibration routine typically provides imaging parameters for the surface mapping routine 132, which derives a surface map from stereo image pairs. In a particular embodiment, tissue 106 is brain tissue, and the surface map is used by the deformation modeling routine 136 to model displacement of tumor 138 in tissue 106 relative to its position as determined in pre-operative magnetic resonance imaging (MRI) and computed tomography X-ray (CAT) images as tissue 106 is deformed by operative procedures such as opening the skull of the patient.

The determination of microscope position sensing and microscope viewing angles through a tracking system are as described in Hai Sun, for simplicity this calibration will not be further elaborated here.

Both the left ($I_L$) and right ($I_R$) camera images of a stereo pair of images as captured by cameras 118, 120 and interface 122 of a particular surface depend on image acquisition settings such as image magnification (m), microscope focal length (f), as well as the relative orientation between the surface with respect to the microscope, or other optical system, known as the optical axis (θ), and spacing between the effective optical centers of the left 139 and right 140 images of the pair. Conceptually, these lead to the following functional form for images acquired:

$$I_L = G_L(m, f, \theta_L), \text{ and } I_R = G_R(m, f, \theta_R)$$

For notational simplicity, we will drop the subscript (L or R) when an image is not specifically referred to either the left or right camera image. Consider an image acquired at a specific base or reference setting S0, in an embodiment the specific reference or base setting is a setting with lowest magnification, $m_0$, shortest focal length, $f_0$, and when the target surface is perpendicular to the optical axis, ($\theta_0 = 0$) as the reference image ($I_0 = G(m_0, f_0, \theta_0)$), while an image obtained at an arbitrary setting S is referred to as optically-deformed image ($I = G(m, f, \theta)$). The difference between these two images, or their "deformation," is measured using by identifying corresponding reference marks of a phantom in images of the phantom taken at the arbitrary setting S and the reference setting S0, and then measuring displacement of the reference marks between the identified locations of the reference marks in the image of the phantom at the arbitrary setting S and the identified locations of the reference marks in the image of the phantom at the reference setting S0.

Figure 1A:
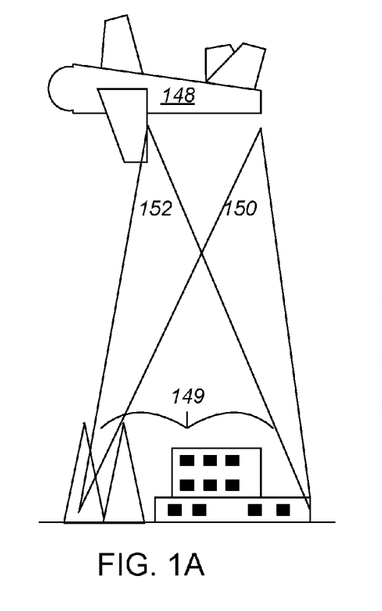
FIG. 1A is a block diagram illustrating an alternative embodiment of a stereo surface-mapping system.

Alternative stereo optical systems include those that may provide pairs of aerial photographs taken from a moving aircraft or reconnaissance drone 148 of terrain 149 at discrete time intervals, as illustrated in FIG. 1A, where the left and right images of a stereo pair may be taken by a single camera at slightly different times such that a first or left image views the surface at a slightly different angle 150 from a second or right image 152. In this embodiment, among the parameters of a reference setting is a particular altitude of drone 148 over terrain or buildings of interest, as well as image magnification, focal length, drone groundspeed and timing between images.

Stereovision Calibration and Reconstruction

Figures 2, 3:
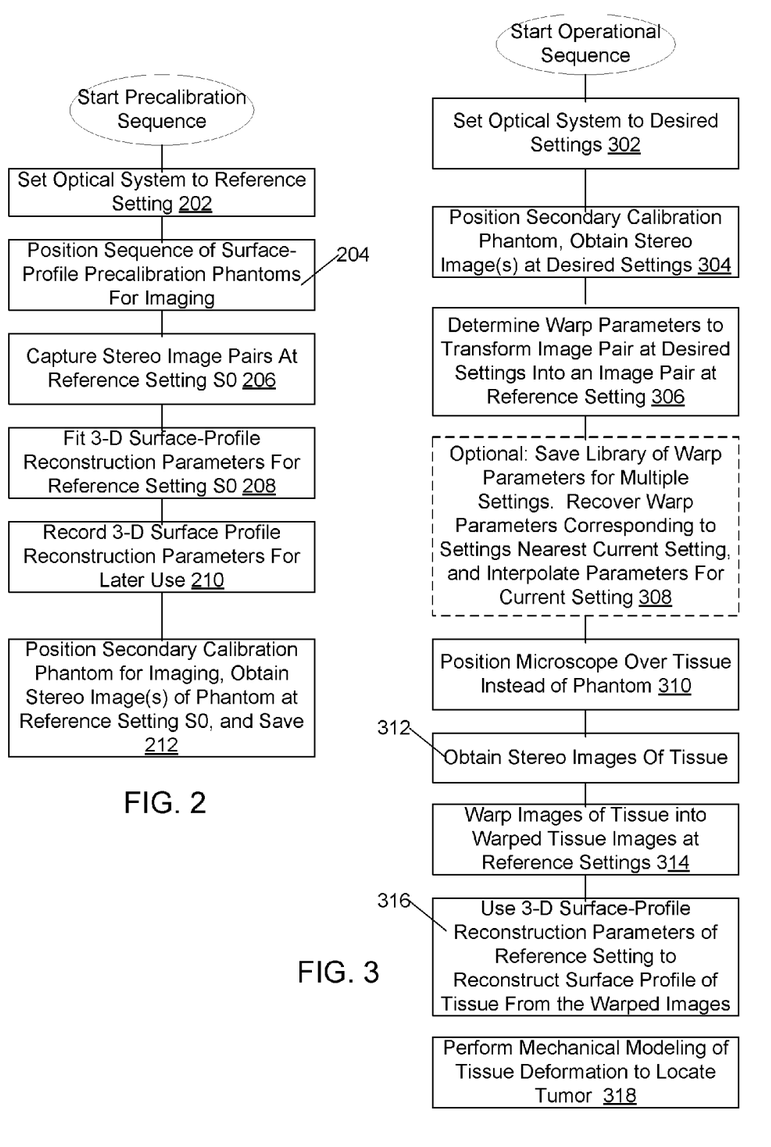
FIG. 2 is a flowchart of a precalibration sequence that determines parameters for extraction of a surface profile from stereo images taken with the optical system in base settings, and saves images of a phantom taken with the optical system in base settings.
FIG. 3 is a flowchart of a sequence for warping stereo images taken with the optical system in a desired setting into equivalent images at base settings, and for reconstructing a surface profile therefrom.

A surface profile extraction system using a stereo optical system, such as that illustrated in FIG. 1 or 1A, is precalibrated by a method corresponding to that illustrated in FIG. 2. The optical system is set 202 to the reference setting S0. A sequence of optical precalibration phantoms are positioned 204 in view of the system, having known surface profiles, and parameters for reconstruction surface mapping routine 132 are derived that are sufficient for reconstructing a surface profile from a pair of stereo images taken with the optical system set 202 to the reference setting.

Techniques for stereo image calibration and reconstruction based on a pinhole camera model and radial lens distortion correction are outlined here for completeness. A 3D point in world space (X, Y, Z) is transformed into the camera image coordinates (x, y) using a perspective projection matrix:

$$\begin{pmatrix} x \\ y \\ 1 \end{pmatrix} = \begin{pmatrix} \alpha_x & 0 & C_x & 0 \\ 0 & \alpha_y & C_y & 0 \\ 0 & 0 & 1 & 0 \end{pmatrix} \times T \times \begin{pmatrix} X \\ Y \\ Z \\ 1 \end{pmatrix}, \quad (1)$$

where $\alpha_x$ and $\alpha_y$ incorporate the perspective projection from camera to sensor coordinates and the transformation from sensor to image coordinates, $(C_x, C_y)$ is the image center, and T is a rigid body transformation describing the geometrical relationship of the optical centers 139, 140 between the views of the two cameras.

A precalibration phantom is prepared having reference marks at known positions in 3D space. A stereo pair of images is taken 206 of the precalibration phantom, assuming the precalibration phantom has known surface profile, providing a plurality of known points in three dimensions. A total of 11 camera parameters (6 extrinsic: 3 rotation and 3 translation; and 5 intrinsic: focal length, f, lens distortion parameter, $k_1$, scale factor, $S_x$, and image center, $(C_x, C_y)$) are then determined through precalibration using a least squares fitting approach. The intrinsic parameters include f focal length, κ• lens distortion coefficient, Sx non-square pixel scalar, Cx; Cy camera center. The extrinsic parameters include R(μx; μy; μz) rigid-body rotation, T(tx; ty; tz) rigid-body translation. Note that we now have a camera model that projects a point in the world to its image coordinates, the next step is to determine (i.e., calibrate) several unknown parameters among the equations presented above. In particular, the extrinsic camera parameters to be calibrated are the rotation and translation matrices (R; T) and the intrinsic parameters are the focal length (f), lens distortion coefficient •, scale factor (Sx), and image center (Cx; Cy).

The 3D precalibration phantoms have easily identified correspondence points or reference marks, where the correspondence points have known height relative to a phantom baseline. Each correspondence point should be identifiable in each of the images of the stereo pair.

Stereo image rectification is performed in a method similar to that of Hai Sun, pages 38-47.

Stereo image rectification is employed next to establish epipolar constraints that limit the search for correspondence points along "epipolar lines" (defined as the projection of the optical ray of one camera via the center of the other camera following a pinhole model). In addition, images are rotated so that pairs of epipolar lines are collinear and parallel to image raster lines in order to facilitate stereo matching. In an embodiment, an intensity-based correlation metric and a smoothness constraint are used to find the correspondence points in both images of the pair. Each pair of correspondence points is then transformed into their respective 3D camera space using the intrinsic parameters, and transformed into a common 3D space using the extrinsic parameters. Together with their respective camera centers in the common space, two optical rays were constructed with their intersection defining the 3D location of each of the correspondence point pair.

Since the 3D locations of the correspondence points are known on the precalibration phantoms, the parameters are fit 208 such that the extraction to a common 3D space gives results where extracted 3D points of an effective surface profile of the precalibration phantom match heights of the known points on the precalibration phantom. These 3D surface profile extraction parameters are then saved 210 for later use.

Next, and not disclosed in Hai Sun, a secondary calibration phantom is positioned 212 in view of the optical system, and a stereo image pair of the secondary calibration phantom as viewed in the reference setting is captured and saved as part of calibration information. In an embodiment, the secondary calibration phantom is a two dimensional, flat, phantom having marks printed thereon. In an embodiment, the marks printed on the secondary calibration phantom are randomly generated squares of random intensities. In an alternative embodiment for use with cameras in aircraft or drones, the secondary calibration phantom is a particular, preselected, field or town.

When it is desired to use the system to extract a surface profile of tissue 106, or terrain 149, the optical system is set to an arbitrary desired setting S, typically having at least some optical system parameters, such as optical magnification, differing from those for the reference setting S0.

Secondary Calibration

With the optical system set 302 to the arbitrary desired setting, the secondary calibration phantom is positioned in view of the optical system in a position approximating that where tissue 106 will be present during surgery, and a stereo image pair of the secondary calibration phantom is captured or taken 304 by cameras 118, 120, taken through the optical system with the optical system configured at a desired setting S.

Next, deformation field parameters DFP for deformation modeling routine 136 are derived 306 such that application of image warping routine 134 to the stereo image pair of the phantom with optical system at desired setting S provides a deformed stereo image pair that closely matches the stereo image pair of the secondary phantom as taken with the optical system in the reference setting S0.

The method for 3D surface extraction herein described warps stereo images captured using a desired setting S, using the deformation field obtained from images of a phantom at desired setting S and reference setting S0, into warped images corresponding to images taken at the reference setting S0. Because the reference setting S0 has been calibrated for surface extraction, the warped stereo images can then be used for surface reconstructing following the same calibration. The key to the technique is to find the equivalent image at a specific setting $S_0$ that has been pre-calibrated for an image acquired at an arbitrary setting S.

Image Deformation Due to the Change in Image Acquisition Settings and Target Surface Orientation To determine image deformation due to the change in image acquisition settings (i.e., m magnification and f focal length), a series of phantom images were acquired using a planar secondary calibration phantom with randomly generated squares of random grayscale intensity by successively changing one parameter from its reference value while maintaining other optical system parameters at the corresponding reference value. In an embodiment, the reference values of image magnification ($m_o$) and focal length ($f_o$) correspond to the lowest magnification and the shortest focal length that the microscope offers, respectively. Because image magnification alters the image acquired independently from the change in f or θ (which was verified with the deformation fields generated by changing m at different f and θ), only one set of images is necessary to determine image deformation field due to the change in m (acquired with $f_o$). With $m_o$, image deformation due to the change in f was also determined by successively increasing f from $f_o$. For all these phantom images, the secondary calibration phantom was perpendicular to the optical axis (i.e., the orientation was maintained at its reference value of $θ_o$=0).

Figure 4:
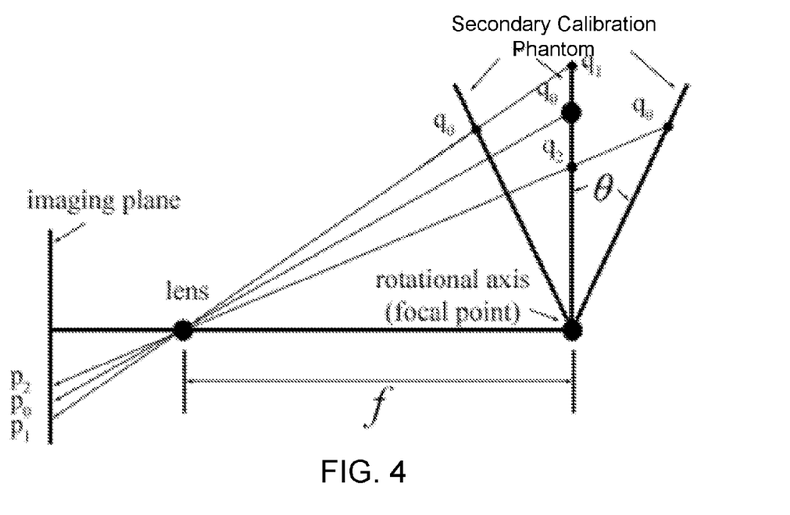
FIG. 4. Illustrates image deformation due to the change in orientation of the target surface with respect to the microscope optical axis using a pinhole camera model.

In order to determine image deformation due to the change in θ, the pinhole camera model was employed. For arbitrary material points, $q_o$ and $q_i$, initially on the secondary calibration phantom positioned at $θ_o$, their corresponding image pixels, $p_o$ and $p_i$ on the imaging plane, are co-linear with the pinhole camera lens (FIG. 4). For a given material point, $q_o$, its new pixel location when the target surface was rotated by θ, is given by the pixel location produced by the material point, $q_i$ on the original target surface (i.e., $θ_o$), that intersects with the line segment generated by the pinhole lens and $q_o$, as illustrate in FIG. 4. Image deformation due to the change is then produced by subtracting the two pixel locations, $p_i$ and $p_o$.

Based on the above description of generating image deformation fields due to the change in m, f, and θ, the following pseudo procedure outlines the sequence of phantom image acquisitions:

1. Set $f=f_o$, and $θ=θ_o$, successively increase m from $m_o$ and acquire images for each setting of m;
2. Set $m=m_o$ and $θ=θ_o$, successively increase f from $f_o$ and acquire images for each setting of f;
3. Set $m=m_o$ and $f=f_o$, successively increase θ from $θ_o$, and acquire images for each setting of θ; verify that the predicted image deformation field based on pinhole camera model matched with measurement.

Image deformation due to the change in m and f are measured using the phantom images. By contrast, image deformation due to the change in θ is computed based on the pinhole camera model, and is verified using the phantom images.

Once appropriate warping parameters, such as a warping deformation field, is determined, the microscope is positioned 310 over tissue 106 instead of the phantom, and stereo images of the tissue are obtained 312 from the cameras 118, 120.

Image Warping to Reference Setting

Next, the stereo images of the tissue are warped 314 by optical warping routine 134 into equivalent images as if they had been taken at the reference settings.

A pseudo algorithm to warp images obtained at an arbitrary image acquisition setting (m, f) and surface orientation relative to the optical axis (θ):

1. Use deformation field due to the change in m to generate image at setting of ($m_o$, f, θ);
2. Use the resulting image and analytical solution of deformation due to the change in θ, produce image at settings of ($m_o$, f, $θ_o$);
3. Use the resulting image and deformation field due to the change in f, to produce a warped image at the reference settings, ($m_o$, $f_o$, $θ_o$);

In an alternative embodiment, a single deformation field, or warping parameters, for the entire transformation from the arbitrary setting (m, f, θ) into a warped image corresponding to an image as if it had been taken at the reference setting ($m_o$, $f_o$, $θ_o$) is used in a single warping operation.

Next, the stereo precalibration parameters obtained from precalibration phantoms with the optical system at the reference setting ($m_o$, $f_o$, $θ_o$) are used to reconstruct 316 a surface profile of the tissue in 3D. The reconstructed surface profile may then be used with a computer model of deformation 136 of the tissue and a pre-surgery location of a tumor or lesion as determined in three dimensions from pre-surgery images obtained by conventional medical imaging devices such as CT scanners and MRI machines to locate 318 the tumor 106 as displaced during surgery in a manner similar to that described by Hai Sun. Alternatively, or in addition to displaced tumor locations, the computer model of deformation of the tissue may be used to determine intra-surgery locations of other anatomic features of the tissue so that these features may be preserved.

Finally, image processor 124 uses a display system 145 to display the surface profile and tumor locations, or locations of other anatomic features, so that a surgeon may remove the tumor or lesion while preserving other critical anatomic features of the tissue.

Library-Based Calibrations

It can be inconvenient to require a surgeon to position a secondary calibration phantom in the field of view of a surgical microscope when the surgeon changes focal length, magnification, or other optical parameters of the system.

Figure 5:
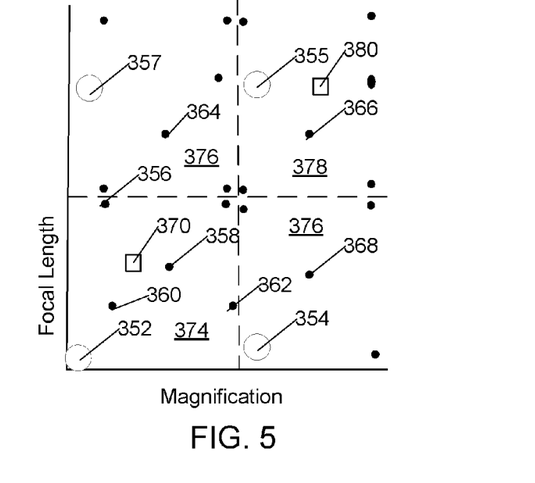
FIG. 5 illustrates primary and secondary calibration points that may be maintained in a library of 3D reconstruction parameters and deformation field parameters.

FIG. 5 illustrates a family of reference settings (including S0) or primary calibration points 352, 354, together with secondary calibration points 356, 358, 360, 362, 364, 366, 368, such as may be stored in a warp deformation field parameter (DFP(n)) and 3D reconstruction parameter multidimensional table or library 372 (FIG. 1). For simplicity, only magnification and focal length are illustrated in FIG. 5 in a two-dimensional diagram representative of a two-dimensional table, in an actual system additional optical parameters, such as angles, may be provided as additional dimensions to the table.

In a particular embodiment, a family of sets of deformation field parameters DFP(n), each set of deformation parameters corresponding to a predetermined secondary calibration point 356, 358, 360, 362, each secondary calibration point corresponding to a particular set of optical parameters, for image warping routine 134. Each set of deformation field parameters is derived by adjusting optical parameters of the system such as the image magnification (m) and focal length (f) parameters to correspond to the predetermined secondary calibration point. The secondary calibration phantom is positioned, an image pair is captured at this calibration point, and a least-squares fit of the parameters such that a warped image pair produced from the image pair closely resembles saved stereo images of the phantom captured at a reference setting S0, such as primary calibration point 352.

An encoder 143 is added to the microscope zoom and focus controls. Warping parameters corresponding to image deformations at each combination of magnification m, focal length f and angle θ, or secondary calibration point, are stored 308 in a multidimensional table indexed by the zoom and focus control settings.

In this table-based embodiment, when surface profile extraction is desired at a runtime arbitrary optical setting set, such as setting 370, during surgery by a surgeon, the runtime optical settings are determined by reading the magnification m, focal length f, and angle using the encoder. Angles are determined by reading microscope angle information from tracker 142.

A deformation field parameter set for the runtime optical setting is determined by interpolation from entries in the table or library 372, Interpolation is performed by finding the table entries associated with the closest entries above 356, 358 and below 360 the runtime settings, and runtime optical warping parameters are interpolated between these table values.

A runtime image pair of tissue is then captured. The runtime optical warping parameters are then used to warp the runtime image pair to an image pair that corresponds to the reference setting S0, 352 as heretofore described, whereupon 3D reconstruction is performed as heretofore described.

The use of a reference setting S0 at the extreme low magnification end of the optical system zoom range, and at a nearest focus length of the optical system focus range, has advantage in that it can be reproducibly set as there is a mechanical stop at these points. Further, when an image is warped to correspond to a lower magnification setting, 3D reconstruction may be more accurately performed than when it is warped to a higher magnification where portions of the warped image exceed the boundaries of images used to calibrate the 3D reconstruction parameters.

In an alternative embodiment, in order to provide more accurate 3D reconstruction at higher magnification and longer focal length settings, additional reference image acquisition settings at the midrange of optical system settings are used in addition to the extreme settings at the lowest magnification and shortest focal length. In this embodiment, additional reference settings 354, 355 are provided at a midrange of magnification. Further, in a particular embodiment, additional reference settings 355, 357 are provided at a reproducible, but greater than minimum, set-point of focal length. 3D reconstruction parameters are determined by primary calibration, similarly to the process heretofore described for determination of 3D reconstruction parameters for the reference setting S0, for each of these additional reference settings 354, 355, 357.

It is desirable that each reference setting S0, 352, 354, 355, 357 be a setting that the optical system can be reproducibly be returned to. Certain microscopes are provided with motorized focus and zoom controls, together with encoders 143. These microscopes may be provided with a preset or bookmark memory permitting them to be returned to a predetermined preset of focus and zoom; these microscopes are particularly adaptable for operation with more than one reference setting. Other microscopes may be equipped with a mechanical detent, such as a detent at a midpoint setting of magnification (or zoom). In embodiments using these optical systems, each reference setting S0, 352, 354, 355 is at setting that is bookmarked or at mechanical detents.

In a multiple-reference-setting embodiment, the plane of focal length and magnification, or in an embodiment having a single angle encoded a 3-space, or in an embodiment having two angles encoded a 4-space, is divided into quadrants, such as quadrant 374, 376, 378, cubes, or hypercubes (hereinafter quadrant) respectively.

In a multiple reference setting embodiment, secondary calibration points, such as calibration points 364, 366, and 368, are determined at multiple optical system settings in each quadrant, according to the procedure for secondary calibration described above, where each secondary calibration point provides distortion field parameters DFPs for warping an image taken at the calibration point to the primary calibration point of the quadrant within which the secondary calibration point lies. For example, in the illustration of FIG. 5, top right quadrant secondary calibration points 366 provide DFPs for warping images to correspond to images taken at the top right quadrant primary calibration point, or reference setting, 355; with bottom left quadrant secondary calibration points 356, 358, 360 provide DFPs for warping images to correspond to images taken at the bottom left quadrant primary calibration point or reference setting 352.

In the multiple-reference-setting embodiment, when a surgeon selects a runtime setting, such as setting 370, 380, the processor 124 uses the encoders 143 to determine the runtime setting. The processor 124 then determines the quadrant in which the runtime setting occurs by comparing the runtime setting with settings of calibration points in the warp and 3D parameter table or library 372. Typically, the quadrant is chosen to be that having a reference setting, such as 352, 355 nearest in focal length to that of the runtime setting, and the nearest magnification setting less than the magnification of the runtime setting. A runtime distortion field parameter (DFP(run)) is then determined by interpolation, as heretofore described, between nearby secondary calibration points recorded in the library 372.

A runtime stereo image is then captured, and warped to correspond to images captured at the primary calibration point or reference setting, of that quadrant, such as setting 352 for the lower left quadrant 374 or setting 355 for runtime settings in the top right quadrant 378. 3D extraction is then performed on the warped image, using 3D extraction parameters recorded in library 372 and associated with the primary calibration point or reference setting 352, 355, associated with that quadrant.

Anticipated Combinations

It is anticipated that features of the method and system herein described may be combined in various ways. In particular, it is anticipated that these features may be combined in virtually any combination, and in particular these features may be combined as follows:

A method designated A of calibrating a system for extracting a surface profile from a stereo pair of images obtained at an arbitrary setting S of an optical system, the method including determining surface profile reconstruction parameters for images obtained with the optical system at a reference setting S0 of the optical system, the reference setting S0 being different from the arbitrary setting S; and determining warping parameters DFP for a digital image processor for warping images obtained with the optical system at the arbitrary setting S into images corresponding to the reference setting S0.

A method designated A1, including the method designated A, AA or AC, further including recording surface profile reconstruction parameters for a plurality of reference settings recorded in a table. A method designated A2, including the method designated A1, A, AA, or AC, further including recording warping parameters DFPs for warping images obtained with predetermined optical settings in a table, measuring a current set of optical parameters corresponding to the arbitrary setting S, and determining warping parameters for the arbitrary setting S by interpolation between the DFPs recorded in the table.

A method designated AA including the method designated A or A1 wherein the settings S and S0 include at least a different configuration for magnification of the optical system.

A method designated AB including the method designated A1, A2, A or AA wherein the settings S and S0 include at least a different configuration for focal length of the optical system.

A method designated AC including the method designated A1, A2, A, AA or AB wherein the machine readable instructions for determining warping parameters further comprise machine readable instructions for using images of a calibration phantom, the calibration phantom having reference marks, to determine the warping parameters.

A method designated AD including the method designated A1, A2, A, AA, AB, or AC wherein the reference marks of the calibration phantom are squares of randomly varied intensity.

A method designated AE including the method designated A1, A2, A, AA, AB, AC, or AD of extracting a surface profile from a stereo pair of images obtained at an arbitrary setting S of an optical system, and further including obtaining the stereo pair of images from at least one camera of the optical system; warping the stereo pair of images into images corresponding to the reference setting $S_0$, and using the surface profile reconstruction parameters to determine the surface profile.

A method designated AF including the method designated A1, A2, A, AA, AB, AC, AD, or AE wherein the surface profile is a surface profile of tissue exposed during surgery, and further including using the surface profile, a pre-surgery three-dimensional location of a tumor in the tissue, and a model of deformation of the tissue to determine an intra-surgery location of the tumor.

A system designated B for extracting a surface profile including an adjustable optical system having at least one reference setting $S_0$ and at least one arbitrary setting S, the optical system having at least one camera for obtaining stereo image pairs, and wherein settings S and S0 include at least a magnification of the adjustable optical system; an image processor coupled to receive stereo image pairs from the at least one camera of the optical system, further comprising a processor and a memory having recorded therein reconstruction parameters for determining a surface profile from images obtained with the optical system at the reference setting $S_0$; machine readable instructions for using warping parameters to warp images obtained with the optical system at the arbitrary setting S into images corresponding to the reference setting $S_0$; and machine readable instructions for using the reconstruction parameters to determine the surface profile.

A system designated BA including the system designated B wherein the settings S0 and S further comprise settings for a focal length of the optical system.

A system designated BB including the system designated B or BA wherein the settings S0 and S further comprise settings for a camera angle of the optical system.

A system designated BBB, including the system designated B, BA, or BB, and further including a library having recorded therein warping parameters DFPs for warping images obtained with predetermined optical settings, and an encoder adapted to measure a current set of optical parameters corresponding to the arbitrary setting S, and machine readable instructions for determining warping parameters for the arbitrary setting S by interpolation between the DFPs recorded in the library.

A system designated BC including the system for extracting a surface profile designated B, BA, BBB, or BB and further including in the memory machine readable instructions for using images of a phantom, the phantom having reference marks, to determine the warping parameters; and wherein the images of the phantom are taken at settings S0 and S.

A system designated BD including the system for extracting a surface profile designated B, BA, BBB or BB, further including an encoder for digitizing at least a magnification setting, and wherein the memory comprises a library of sets of warping parameters (DFP(n)), each set of warping parameters corresponding to a particular setting S(n), the warping parameters stored a multidimensional table indexed by at least a digitized magnification setting.

A system designated BE, including the system designated BD, the library further comprising 3D surface reconstruction parameters for at least two reference settings S1 and S2, and the system further including machine readable instructions for determining a reference setting S0 for an arbitrary setting S by selecting from the at least two reference settings S1 and S2 based upon at least magnification associated with setting S.

A system designated BF, including the system designated BD or BE, for extracting a surface profile and further including an encoder for digitizing at least a focal-length setting, wherein the library of sets of warping parameters is further indexed by at least a digitized focal-length setting.

A system designated BG, including the system designated B, BA, BB, BBB, BC, BD, BE, or BF, and further including machine readable instructions for modeling deformation of the tissue to determine an intra-surgery location of an anatomic feature from the surface profile and preoperative images.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method of calibrating a system for extracting a surface profile from a stereo pair of images obtained at an arbitrary setting S of an optical system, comprising:
   determining surface profile reconstruction parameters for a stereo pair of images obtained with the optical system at a reference setting S0 of the optical system, the reference setting S0 being different from the arbitrary setting S;
   determining warping parameters for a digital image processor for warping the stereo pair of images obtained with the optical system at the arbitrary setting S into a stereo pair of warped images corresponding to the reference setting S0;
   wherein the settings S and S0 include at least a different configuration for magnification of the optical system;
   and further comprising recording surface profile reconstruction parameters for a plurality of reference settings in a table.

2. The method of claim 1 further including recording warping parameters (DFPs) for warping stereo pairs of images obtained at each of a plurality of predetermined optical settings into stereo pairs of warped images corresponding to the reference setting $S_0$ in the table, measuring a current set of optical parameters corresponding to the arbitrary setting S, and determining warping parameters for warping the stereo pair of images obtained with the optical system at the arbitrary setting S into the stereo pair of warped images corresponding to the reference setting S0 by interpolation between the DFPs recorded in the table.

3. A of calibrating a system for extracting a surface profile from a stereo pair of images obtained at an arbitrary setting S of an optical system, comprising:
determining surface profile reconstruction parameters for a stereo pair of images obtained with the optical system at a reference setting S0 of the optical system, the reference setting S0 being different from the arbitrary setting S;
determining warping parameters for a digital image processor for warping the stereo pair of images obtained with the optical system at the arbitrary setting S into a stereo pair of warped images corresponding to the reference setting S0;
wherein the settings S and S0 include at least a different configuration for magnification of the optical system;
the arbitrary setting S of the optical system comprising an S-magnification setting and the reference setting S0 of the optical system comprising a S0-magnification setting, the S0 and S magnification settings being different;
and further including recording warping parameters (DFPs) for warping stereo pairs of images obtained at each of a plurality of predetermined optical settings into stereo pairs of warped images corresponding to the reference setting $S_0$ in the table, measuring a current set of optical parameters corresponding to the arbitrary setting S, and determining warping parameters for warping the stereo pair of images obtained with the optical system at the arbitrary setting S into the stereo pair of warped images corresponding to the reference setting S0 by interpolation between the DFPs recorded in the table.

4. A method of calibrating a system for extracting a surface profile from a stereo pair of images obtained at an arbitrary setting S of an optical system, comprising:
determining surface profile reconstruction parameters for a stereo pair of images obtained with the optical system at a reference setting S0 of the optical system, the reference setting S0 being different from the arbitrary setting S;
determining warping parameters for a digital image processor for warping the stereo pair of images obtained with the optical system at the arbitrary setting S into a stereo pair of warped images corresponding to the reference setting S0;
wherein the settings S and S0 include at least a different configuration for magnification of the optical system;
wherein the step of determining warping parameters further comprises machine readable instructions for using images of a calibration phantom, the calibration phantom having reference marks, to determine the warping parameters.

5. The method of claim 4 wherein the reference marks of the calibration phantom are squares of randomly varied intensity.

6. A method of extracting a surface profile from a stereo pair of images obtained at an arbitrary setting S of an optical system, comprising:
determining surface profile reconstruction parameters for a stereo pair of images obtained with the optical system at a reference setting S0 of the optical system, the reference setting S0 being different from the arbitrary setting S;
determining warping parameters for a digital image processor for warping the stereo pair of images obtained with the optical system at the arbitrary setting S into a stereo pair of warped images corresponding to the reference setting S0;
wherein the settings S and S0 include at least a different configuration for magnification of the optical system;
wherein the surface profile is a surface profile of tissue exposed during surgery, and further comprising:
using the surface profile, a pre-surgery three-dimensional location of a tumor in the tissue, and a model of deformation of the tissue to determine an intra-surgery location of the tumor.

7. A method of extracting a surface profile from a stereo pair of images obtained at an arbitrary setting S of an optical system, comprising:
determining surface profile reconstruction parameters for a stereo pair of images obtained with the optical system at a reference setting S0 of the optical system, the reference setting S0 being different from the arbitrary setting S;
determining warping parameters for a digital image processor for warping the stereo pair of images obtained with the optical system at the arbitrary setting S into a stereo pair of warped images corresponding to the reference setting S0;
wherein the settings S and S0 include at least a different configuration for magnification of the optical system;
and further comprising:
obtaining the stereo pair of images obtained at the arbitrary setting S of the optical system from at least one camera of the optical system;
warping the stereo pair of images obtained at the arbitrary setting S of the optical system into a stereo pair of warped images corresponding to the reference setting S0, and using the surface profile reconstruction parameters to determine the surface profile;
further comprising recording warping parameters DFPs for warping images obtained with predetermined optical settings in a table, measuring a current set of optical parameters corresponding to the arbitrary setting S, and determining warping parameters for the arbitrary setting S by interpolation between the DFPs recorded in the table.

8. A system adapted for extracting a surface profile comprising:
an adjustable optical system having a reference setting $S_0$ and at least one arbitrary setting S, the optical system having at least one camera for obtaining stereo image pairs, and wherein settings S and S0 include at least a magnification of the adjustable optical system;
an image processor coupled to receive stereo image pairs from the at least one camera of the optical system, further comprising a processor and a memory having recorded therein:
reconstruction parameters for determining a surface profile from images obtained with the optical system at the reference setting $S_0$;
machine readable instructions for using warping parameters to warp images obtained with the optical system at the arbitrary setting S into images corresponding to the reference setting $S_0$; and
machine readable instructions for using the reconstruction parameters to determine the surface profile; and further comprising:
a library having recorded therein warping parameters DFPs for warping images obtained with predetermined optical settings,
an encoder adapted to measure a current set of optical parameters corresponding to the arbitrary setting S, the current set of optical parameters including at least a magnification,
and the memory configured with machine readable instructions for determining warping parameters for the arbitrary setting S by interpolation between the DFPs recorded in the library.

9. The system for extracting a surface profile of claim 8 further comprising machine readable instructions for using images of a phantom, the phantom having reference marks, to determine the warping parameters; and wherein the images of the phantom are taken at settings S0 and S.

10. The system of claim 9 further comprising:
machine readable instructions for modeling deformation of the tissue to determine an intra-surgery location of an anatomic feature from the surface profile and preoperative images.

11. The system for extracting a surface profile of claim 8, the library further comprising 3D surface reconstruction parameters for at least two reference settings S1 and S2, and the system further including machine readable instructions for determining a reference setting S0 for an arbitrary setting S by selecting from the at least two reference settings S1 and S2 based upon at least magnification associated with setting S.

12. The system for extracting a surface profile of claim 8 further comprising an encoder for digitizing at least a focal-length setting, wherein the library of sets of warping parameters is further indexed by at least a digitized focal-length setting.

13. The system of claim 12 further comprising:
machine readable instructions for modeling deformation of the tissue to determine an intra-surgery location of an anatomic feature from the surface profile and preoperative images.

14. A system adapted for extracting a surface profile comprising:
an adjustable optical system having a reference setting $S_0$ and at least one arbitrary setting S, the optical system having at least one camera for obtaining stereo image pairs, and wherein settings S and S0 include at least a magnification of the adjustable optical system,
an image processor coupled to receive stereo image pairs from the at least one camera of the optical system, further comprising a processor and a memory having recorded therein:
reconstruction parameters for determining a surface profile from images obtained with the optical system at the reference setting $S_0$;
machine readable instructions for using warping parameters to warp images obtained with the optical system at the arbitrary setting S into images corresponding to the reference setting $S_0$; and
machine readable instructions for using the reconstruction parameters to determine the surface profile; and
further comprising:
machine readable instructions for modeling deformation of the tissue to determine an intra-surgery location of an anatomic feature from the surface profile and preoperative images.

* * * * *

UNITED STATES PATENT AND TRADEMARK OFFICE
CERTIFICATE OF CORRECTION

PATENT NO. : 9,456,200 B2  
APPLICATION NO. : 14/370713  
DATED : September 27, 2016  
INVENTOR(S) : Songbai Ji et al.

Page 1 of 1

It is certified that error appears in the above-identified patent and that said Letters Patent is hereby corrected as shown below:

Column 13, Claim 3, Line 7: Delete "A of" and replace with -- A method of --

Signed and Sealed this  
Seventh Day of March, 2017

Michelle K. Lee  
*Director of the United States Patent and Trademark Office*

UNITED STATES PATENT AND TRADEMARK OFFICE
CERTIFICATE OF CORRECTION

Page 1 of 1

PATENT NO. : 9,456,200 B2
APPLICATION NO. : 14/370713
DATED : September 27, 2016
INVENTOR(S) : Songbai Ji et al.

It is certified that error appears in the above-identified patent and that said Letters Patent is hereby corrected as shown below:

In the Specification

At Column 1, Lines 16-19:
"The work herein described was performed with sponsorship from the National Institutes of Health grant number ROI CA159324-01. The United States Government has certain rights in the invention."

Should read:
-- This invention was made with government support under grant number R01 CA159324 awarded by the National Institutes of Health. The government has certain rights in the invention. --

Signed and Sealed this
Seventeenth Day of March, 2020

Andrei Iancu
*Director of the United States Patent and Trademark Office*